No. 640,679. Patented Jan. 2, 1900.
R. L. MARSHALL.
DISTANCE FINDER.
(Application filed May 27, 1899.)
(No Model.) 2 Sheets—Sheet 2.
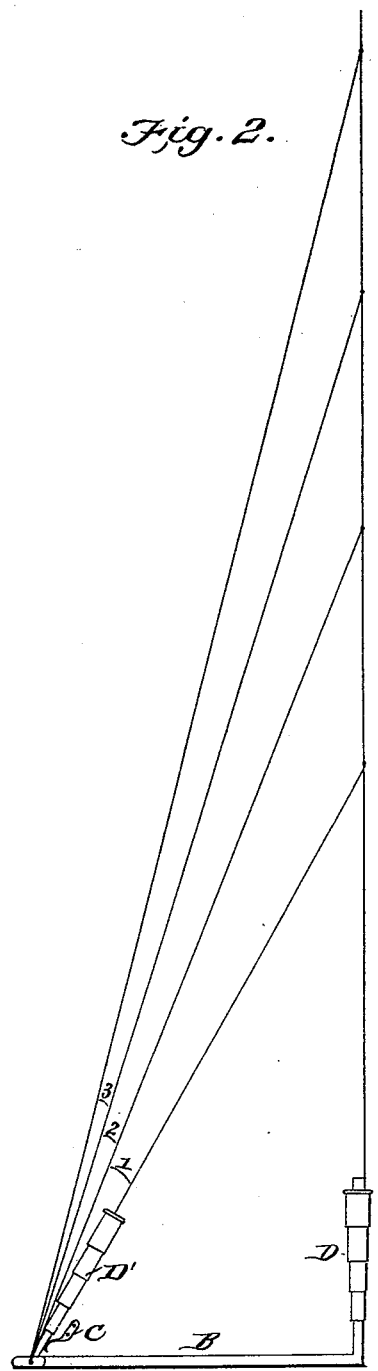
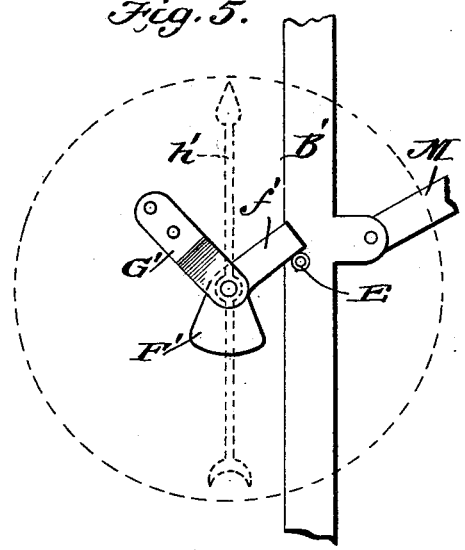
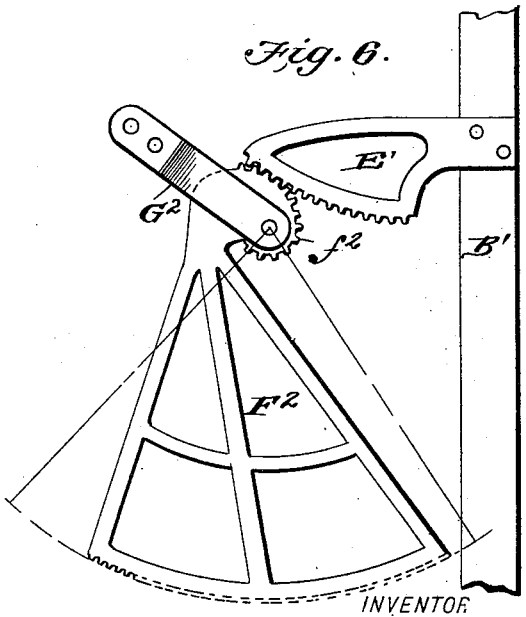

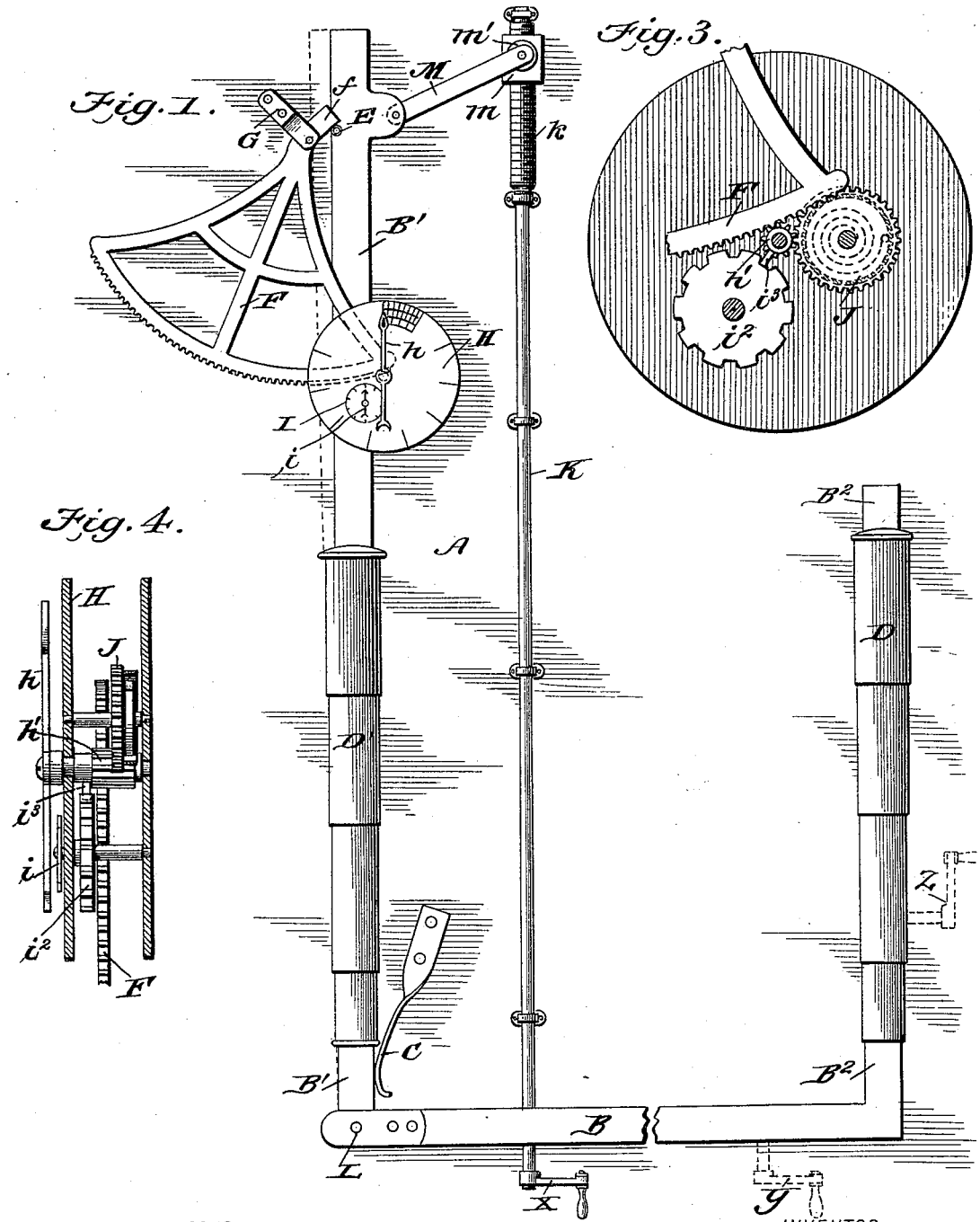

UNITED STATES PATENT OFFICE.

ROBERT L. MARSHALL, OF ELIZABETHTOWN, KENTUCKY, ASSIGNOR OF ONE-FOURTH TO A. C. LARKIN PERCEFULL, OF SAME PLACE.

DISTANCE-FINDER.

SPECIFICATION forming part of Letters Patent No. 640,679, dated January 2, 1900.

Application filed May 27, 1899. Serial No. 718,548. (No model.)

*To all whom it may concern:*

Be it known that I, ROBERT L. MARSHALL, of Elizabethtown, in the county of Hardin and State of Kentucky, have invented a new and useful Improvement in Distance-Finders, of which the following is a specification.

The object of my invention is to provide a simple, practical, and accurate instrument for finding the distance or range of any remote object at once by a simple adjustment without any calculation or computation whatever. It belongs to that class of instruments in which two telescopes are fixed at opposite ends of a base-line, and one of said telescopes is made adjustable to sight along the hypotenuse of a right-angled triangle, this adjustable telescope being connected by gears with an index-hand which registers on an amplified scale the distances for the varying angles formed by the hypotenuse when alined upon objects at varying distances.

My invention consists in the peculiar construction and arrangement of the parts of an instrument operating on this principle and designed to give more accurate results than have heretofore been obtained.

Figure 1 is a plan view of the instrument. Fig. 2 is a diagram showing its mode of use. Fig. 3 is a view of the adjusting devices with the graduated dial removed. Fig. 4 is an edge view of the gears shown in Fig. 3, and Figs. 5 and 6 show modifications.

In the drawings, A represents any suitable table-surface, on which is mounted a frame consisting of the part B, representing the base-line of the right-angled triangle, a bar $B^2$, rigidly fixed to the base-line and at right angles to it, and the bar B', which is jointed at L to the base-line bar B, so as to swing at varying angles to the bar $B^2$.

The base-bar B is preferably about five feet long, so as to give a base-line of suitable length. On the bar $B^2$ is mounted in alinement the telescope D, and on the movable hypotenuse-bar B' is mounted another telescope D', fixed to the bar B' in alinement therewith and movable with it.

In use the movable telescope D', base-line B, and fixed telescope D occupy the position shown in the diagram Fig. 2, in which it will be seen that objects remote from the telescope when sighted by the telescope D will require the movable telescope D' to be adjusted at the various angles 1 2 3 in order to intersect the object. This movement of telescope D' is made to register on a graduated scale the distances, so that all that it is necessary to do is to sight the telescope D on the remote object, then adjust the telescope D' until it also sights the object, and then to read off on a scale the position of a pointer or index-hand which has been moved by the adjustment of the telescope D', and this position of the index-hand indicates at once without computation the distance of the object. Instruments operating on this principle have heretofore been constructed; but the means which I employ for transferring the movement of the hypotenuse-bar or movable telescope to the index-hand comprehend a new principle that adds great accuracy and efficiency to the instrument, which I will now describe.

K, Fig. 1, is a shaft arranged in bearings on the table-surface in parallel position to the arm $B^2$ of the frame and bearing at one end a turning-crank X and at the other having a screw-threaded end $k$, that is tapped through a nut $m$, having an accurate interior thread fitting the screw-threaded end $k$ of the rod K. This nut $m$ is jointed to a toggle-bar M by a swiveling plate $m'$, and the toggle-bar at its other end is jointed to an offset on the hypotenuse-bar B'.

F is a quadrantal segment having on its arc fine teeth of uniform size accurately cut. This segment is fulcrumed in a fixed frame-plate G.

E is a pin or roller mounted on the movable hypotenuse-bar B' and arranged to bear against a projection $f$ of the segment on the opposite side of the fulcrum from the teeth. The bearing-face on the side of the projection $f$ should be of ruby or other hard mineral to prevent wear and friction.

H is a graduated dial having in its center an index-hand $h$, which is mounted on a shaft that has a pinion $h'$, Fig. 3, that engages directly with the teeth of the segment, so that when the segment F moves about its fulcrum the index-hand $h$ is deflected and made to travel over the graduations on the dial. To bring the hand back again to the position of rest and take up slack or looseness the pinion $h'$ is arranged in mesh with a series of teeth on a spring-barrel J. I is a second smaller dial with an index-hand $i$, that is fixed to a notched disk $i^2$, which has ten notches in it, and into which there works a lug or tappet-arm $i^3$, fixed to the pinion or shaft of the large index-hand $h$. The purpose of this is to cause each revolution of the large index-hand $h$ to register itself on the small dial by moving its hand one space. This extends the range of the instrument to ten times the number of subdivisions on the larger dial.

Now in pointing out with greater distinctness the principle of my invention it will be noted by reference to Fig. 2 that as the object becomes more remote the movable telescope is adjusted to a position more nearly parallel with the other telescope D. In Fig. 1 this is accomplished by turning the shaft K so as to draw the nut $m$ toward the observer. This in bringing the toggle-arm M to a position more nearly at right angles to the shaft K projects the bar B' and telescope D' outwardly, as shown by dotted lines, and the pin or roller E, acting on the extension $f$ of the segment F, deflects the latter, and so turns the index-hand $h$. It will be observed, however, that as the toggle-arm M approaches the right-angular position to shaft K the moving effect of arm M has a constantly-increasing power on bar B', but diminished speed or throw on the same, while in the effect of the pin or roller E on the segment F just the reverse takes place—that is to say, the action of pin E in approaching the center of segment F is to exert a constantly-diminished power, but increased speed or throw for the segment F. In other words, the action of M upon B' is with a constantly-increased power and diminished speed, while the action of E upon F is with a constantly-decreasing power, but increased speed or throw, and these two factors may be so adjusted as to allow the dial H to be spaced off with equal graduations, which is a feature of great importance in securing accurate results in an instrument of this class.

To prevent loose motion at the point of articulation of bar B' with the base-bar B, a spring C is made to press constantly upon the same.

An adjusting-crank Y is provided, which by suitable mechanism (not shown) is made to adjust the frame B B' B² up or down, and another crank Z serves to adjust the instrument to the right or left. These features, however, are common, and as they form no novel part of my invention it is not necessary to show or describe them in detail.

As modifications of my invention the smooth and sliding contact between the bearing-points E and $f$ may, as in Fig. 6, be replaced by an eccentric toothed segment E', meshing with a volute spiral gear $f^2$ on segment F² and having the same principle of differential leverage, it being understood that the bar B' is moved by a toggle-link M. (Seen in Fig. 1.) I may also in instruments of short range dispense with the enlarged toothed end of segment F, as seen at F', Fig. 5, and preserve only its fulcrum-shaft and extension $f'$ and mount index-hand $h'$ directly on the fulcrum-shaft of the extension $f'$, in which case the graduated disk is concentric with the fulcrum-shaft of the extension $f'$.

Having thus described my invention, what I claim as new, and desire to secure by Letters Patent, is—

1. In a range-finder having a base-line, a stationary telescope at right angles thereto, and a movable hypotenuse-bar jointed thereto and having a second telescope; of means for adjusting the hypotenuse-bar, comprising a laterally-adjusting device for the same which has a variable throw or range of deflection, an index-hand and dial, and mechanism between the index-hand and the hypotenuse-bar which also has a variable throw or range of movement the variable throw of one of these parts being reverse to that of the other in respect to the relation of speed and power substantially as and for the purpose described.

2. In a range-finder, the combination of base-line bar, a stationary telescope at right angles thereto, and a movable hypotenuse-bar jointed thereto and bearing a second telescope, means for adjusting the hypotenuse-bar consisting of a screw-shaft, a nut, and a toggle-arm, a graduated dial with index-hand bearing a pinion, a toothed segment having a stationary fulcrum and meshing with said pinion and having also an extension $f$, and a bearing-surface on the hypotenuse-bar adapted to act against the extension $f$ substantially as and for the purpose described.

3. In a range-finder, the combination of a base-line bar, a stationary telescope at right angles thereto, and a movable hypotenuse-bar jointed thereto and bearing a second telescope, means for adjusting the hypotenuse-bar consisting of a screw-shaft, a nut, and a toggle-arm, a toothed segment having a stationary fulcrum and an extension $f$, a bearing-surface on the hypotenuse-bar adapted to act upon the extension $f$, an index-hand $h$ with pinion meshing with the segment, a spring for restoring the hand and segment to its position of rest, a graduated dial, and a smaller supplementary dial with index-hand connected by a diminishing-gear with the index-hand of the large dial substantially as and for the purpose described.

ROBERT L. MARSHALL.

Witnesses:
　EDW. W. BYRN,
　H. C. LARKIN PERCEFULL.